United States Patent [19]

Tokunaga et al.

[11] 4,098,907
[45] Jul. 4, 1978

[54] METHOD OF PREPARING THE CATALYST COMPONENT FOR α-OLEFIN POLYMERIZATION

[75] Inventors: Shoichi Tokunaga, Shinnanyo; Atsumi Kato; Yoshikazu Takahashi, both of Hikari; Kiyoshi Yamane, Hohu, all of Japan

[73] Assignee: Toyo Stauffer Chemical Co., Ltd., Japan

[21] Appl. No.: 749,080

[22] Filed: Dec. 9, 1976

[30] Foreign Application Priority Data

Dec. 16, 1975 [JP] Japan .............................. 50-149697

[51] Int. Cl.² .......................... C08F 4/66; C08F 10/06
[52] U.S. Cl. .............................. 526/116; 252/429 B; 252/429 C; 526/119; 526/122; 526/127; 526/142; 526/158; 526/351; 526/906
[58] Field of Search ............... 252/429 B, 429 C, 441; 526/142, 158, 116, 119, 122, 127

[56] References Cited

U.S. PATENT DOCUMENTS 3,984,350  10/1976  Karagannis et al. .............. 526/142

FOREIGN PATENT DOCUMENTS 2,509,886  9/1975   Fed. Rep. of Germany.
1,370,559  10/1974  United Kingdom.
1,391,067  4/1975   United Kingdom.

*Primary Examiner*—Edward J. Smith
*Attorney, Agent, or Firm*—Wenderoth, Lind & Ponack

[57] ABSTRACT

A method of preparing reformed titanium trichloride catalyst for α-olefin polymerization which comprises simultaneously pulverizing an organoaluminum compound and a crystalline titanium trichloride compound, the latter comprising titanium trichloride and aluminum trichloride, subsequently treating the pulverized mixture with a solvent selected from oxygen-containing organic compounds, and finally treating the thus treated titanium trichloride with a halide of a metal selected from the groups IV and V of the periodic table.

26 Claims, No Drawings

METHOD OF PREPARING THE CATALYST COMPONENT FOR α-OLEFIN POLYMERIZATION

BACKGROUND OF THE INVENTION

1. Field of the Invention

This invention relates to a method for manufacturing a reformed titanium trichloride which, in the polymerization of α-olefin, makes it possible to obtain a highly stereospecific polymer with a high polymerization activity.

2. Discription of the Prior Art

Either in the presence or in the absence of an inert solvent, a catalyst system comprising a halide of a metal selected from the groups IV, V and VI of the periodic table and an organometal compound of a metal selected from the groups I, II and III of the periodic table has generally been known as Ziegler-Natta catalyst.

For example, titanium trichloride, which is selected from halides of the metals belonging to the groups IV, V and VI of the periodic table, and an organoaluminum compound which is selected from organometal compounds of the metals belonging to the groups I, II and III, are in use as catalyst for the polymerization of α-olefin such as propylene and have brought about good results.

The titanium trichloride manufacturing method is well known. Namely, a solid solution or a crystalline compound comprising aluminum trichloride and titanium trichloride which is obtained from the reduction of titanium tetrachloride with metal aluminum in the presence of aluminum trichloride and which is approximately of a structure of $3TiCl_3 \cdot AlCl_3$ is pulverized by means of various pulverizers. The titanium trichloride which is prepared through such processes is being advantageously used for industrial purposes.

When α-olefin is polymerized using the above mentioned catalyst system, it is extremely advantageous for industrial purposes to enhance the formation ratio of stereospecific polymer, that is, the isotactic yield (hereinafter called "I.Y.") and the catalyst efficiency of titanium trichloride, that is, the polymerization activity.

On the one hand, for a higher catalyst efficiency, therefore, there have been attempted various methods such as broadening the specific surface area of titanium trichloride by pulverizing it into finer particles.

Such a simple method of physical pulverization into finer particles alone not only does not bring about any great improvement in the polymerization activity of titanium trichloride but also produces a degraded particle characteristic of the polymer product because of the formation of fine polymer particles to a great extent when such a finely pulverized titanium trichloride is employed as a component of a catalyst in the polymerization of α-olefin.

A catalyst system comprising titanium trichloride and triethylaluminum brings about higher polymerization activity but results in the formation of a considerable amount of an amorphous polymer generally termed atactic polymer which is of a low economic value, so such a catalyst system is disadvantageous for industrial use because of complicating processes after polymerization.

On the other hand, for higher yield of stereospecific polymer, there have been proposed various methods such as adding what is called a third component into polymerization system and using titanium trichloride mixed with a third component in a pulverizer as a component of a catalyst system. According to these methods, the initial purpose to improve I.Y. can be successful, but the added third components often cause adverse effects on the polymerization activity. Moreover, when they are contained in polymerization solvents, it generally needs to provide equipments in order to separate them from the polymerization solvents.

When they are contained in polymer products, they also cause coloring and smelling of the polymer products. Therefore any of the methods proposed until now does not always provide satisfactory results on the polymerization of α-olefin such as propylene.

SUMMARY OF THE INVENTION

As regards a method for improving a titanium trichloride catalyst component, the present inventors previously found out and proposed that a reformed titanium trichloride used as a catalyst component for the polymerization of α-olefin, did not suffer any loss of I.Y. but brought about higher polymerization activity (Japanese Patent Application No. 49-54032). Namely, the reformed titanium trichloride was prepared by simultaneously pulverizing (hereinafter called "co-pulverizing") a solid solution or a crystalline compound comprising titanium trichloride and aluminum trichloride (hereinafter called "a crystalline titanium trichloride compound") and an organoaluminum compound, treating the co-pulverized mixture with an organic ether compound, and heating the thus treated titanium trichloride. The present inventors went deeper into the study of reforming a titanium trichloride catalyst component and reached to this invention, a discovery of a more improved reformed titanium trichloride than the previously proposed one. Namely, the present reformed titanium trichloride is prepared by co-pulverizing a crystalline titanium trichloride compound and an organoaluminum compound, treating the co-pulverized mixture with an oxygen-containing organic compound, and treating the thus treated titanium trichloride with halides of metals selected from the groups of IV and V of the periodic table. This reformed titanium trichloride used as a catalyst component for polymerization of α-olefin has much higher polymerization activity and brings about higher yield of stereospecific polymer than the previous one.

For instance, when propylene is homo-polymerized in the presence of the present reformed titanium trichloride, its polymerization activity is several times as high as that of a commercially available titanium trichloride. The obtained polymer has a high bulk density and is colorless and odorless. The handling in processes after polymerization is very easy.

In other words, this invention offers a method for manufacturing a valuable reformed titanium trichloride as a catalyst component for polymerization of α-olefin which is characterized in that the reformed titanium trichloride is prepared by co-pulverizing a crystalline titanium trichloride compound and an organoaluminum compound, treating the co-pulverized mixture with an oxygen-containing organic compound, and finally treating the thus treated titanium trichloride with halides of metals selected from the groups of IV and V of the periodic table.

DETAILED DESCRIPTION OF PREFERRED EMBODIMENTS

The crystalline titanium trichloride compound, that can be employed as material for the preparation of the reformed titanium trichloride by which the catalyst system in this invention is characterized includes: (1) a crystalline compound of titanium trichloride which comprises titanium trichloride and aluminum trichloride, which crystalline compound is prepared by obvious methods such as reducing titanium tetrachloride with metal aluminum in the presence of aluminum trichloride and then removing excess titanium tetrachloride by means of distillation, and it is expressed approximately by the formula $3TiCl_3 \cdot AlCl_3$, or a substance prepared by pulverizing above stated crystalline compound of titanium trichloride by means of various pulverizers; and (2) a titanium trichloride which contains an aluminum trichloride in the form of a solid solution, which solid solution is prepared by simultaneous pulverization carried out with various pulverizers on the aluminum trichloride added to titanium trichloride obtained by reducing titanium tetrachloride with hydrogen or metal titanium. In other words, the titanium trichloride used as material for the preparation of the reformed titanium trichloride may be selected from solid solution or crystalline compounds consisting of titanium trichloride and aluminum trichloride. Particularly, the substance obtained by pulverizing the crystalline titanium trichloride compound prepared by reducing titanium tetrachloride with metal aluminum in the presence of aluminum trichloride by means of various pulverizers, namely the crystalline titanium trichloride compound which is now widely in use as a component of a catalyst for the polymerization of α-olefin such as propylene, is preferable as a material for the preparation of the reformed titanium trichloride in this invention.

As for the organoaluminum compound to be co-pulverized with the crystalline titanium trichloride compound, the organoaluminum compound which is expressed by the formula $AlRnX_3\text{-}n$ ($0 < n \leq 3$; R and X represent a hydrocarbon radical having 1-16 of carbon atoms and a halogen atom or a hydrogen atom, respectively.) can be employed. Such organoaluminum compounds include trimethyl aluminum, triethylaluminum, tri-n-propyl aluminum, tri-n-butyl aluminum, triisobutyl aluminum, tri-n-hexyl aluminum, tri-2-pentyl aluminum, tri-n-octyl aluminum, tri-n-decyl aluminum, tri-n-dodecyl aluminum, tri-n-hexadecyl aluminum, diethyl aluminum chloride, di-n- propyl aluminum chloride, diisobutyl aluminum chloride, methyl aluminum sesquichloride, ethyl aluminum dichloride, isobutyl aluminum dichloride, diethyl aluminum iodide, diethyl aluminum hydride, diisobutyl aluminum hydride, etc. These organoaluminum compounds can be employed in any form such single or mixture of the organoaluminum compounds or a dilute solution with inert hydrocarbons. Such inert hydrocarbons include n-hexane, n-heptane, octane, cyclohexane, etc.

The quantity of the organoaluminum compound which is to be co-pulverized with the crystalline titanium trichloride compound may be set within the range from 0.1 to 25 parts, by weight desirably from 3 to 15 parts of the organoaluminum compound to 100 parts of the crystalline titanium trichloride compound. If the quantity of the organoaluminum compound is less than 0.1 part against 100 parts of the crystalline titanium trichloride compound, there will be no effect of co-pulverization. On the other hand, if it exceeds 25 parts against 100 parts of the crystalline titanium trichloride compound, the copulverized mixture tends to stick to inner walls of the pulverizer or to the grinding medium employed during the co-pulverizing process.

The addition of the organoaluminum compound to the crystalline titanium trichloride compound can be made at any time for co-pulverization. Namely, the co-pulverization may be carried out after mixing an organoaluminum compound with a crystalline titanium trichloride compound which has not been pulverized or it may further by carried out after the addition of the organoaluminum compound to a crystalline titanium trichloride compound which has already been pulverized.

The co-pulverization of a crystalline titanium trichloride compound and an organoaluminum compound can be accomplished with various kinds of pulverizers that are widely known such as vibration mills, ball mills, etc. The time for co-pulverization varies depending on the type of the pulverizer employed, the grinding intensity and the degree of previous pulverization already made on the crystalline titanium trichloride compound. The copulverization of a crystalline titanium trichloride compound which has not been pulverized, with an organoaluminum compound usually takes a relatively long period of time. However, when a crystalline titanium trichloride compound has been sufficiently pulverized beforehand, the co-pulverization of it with an organoaluminum compound can be accomplished within a relatively short period of time.

For the manufacture of the reformed titanium trichloride in this invention, the process of co-pulverizing a crystalline titanium trichloride compound and an organoaluminum compound is indispensable. The merit of the reformed titanium trichloride which characterizes this invention can not be attained by merely bringing the crystalline titanium trichloride compound into contact with the organoaluminum compound, even if the treatment is carried out thereafter with the above stated organic solvent and then the treatment with halides of metals is also carried out as described in the foregoing. For instance, the present inventors made an experiment wherein a previously pulverized crystalline titanium trichloride compound and an organoaluminum compound such as diethyl aluminum chloride were brought into contact with each other in inert hydrocarbon such as n-heptane; thus processed material was treated with an oxygen-containing organic compound such as n-butyl ether and then treated with a halide of a metal selected from the groups of IV and V of the periodic table such as titanium tetrachloride; and polymerization was carried out using a catalyst system comprising thus obtained catalyst and organoaluminum compound. Through this experiment, it was comfirmed that this catalyst system did not have any advantageous effects on the polymerization of α-olefin such as propylene, etc.

On the other hand, an improvement of polymerization activity won't be obtained in the polymerization by the copulverized mixture of the crystalline titanium trichloride compound and the organoaluminum compound. However, the great improvement of polymerization activity is brought about by treating this co-pulverized mixture with an oxygen-containing organic compound. In this invention, the process for treating this co-pulverized mixture with an oxygen-containing organic compound after co-pulverization of the crystalline titanium trichloride compound and the organoaluminum compound is indispensable.

The treatment with an oxygen-containing organic compounds in this invention is carried out as follows: the co-pulverized mixture is suspended in an oxygen-containing organic compound or a dilute solution of it and mixed by stirring; subsequently a solid fraction (hereinafter called "a treated titanium trichloride") is separated by filtration or decantation and then the treated titanium trichloride is washed with an inert hydrocarbon several times. A titanium trichloride obtained by co-pulverization with organoaluminum compound after treating of a crystalline titanium trichloride compound with an oxygencontaining organic compound does not have any advantageous effects on the polymerization of α-olefin.

The oxygen-containing organic compounds usable for this inventive treatment include: (1) aliphatic ethers such as ethylether, propylether, n-butylether, n-amylether, isoamylether, n-hexylether, ethylpropylether, ethylisopropylether, ethylbutylether, ethylisobutylether, ethylisoamylether, proparagylether, etc.; (2) aromatic ethers such as anisole; phenetole, diphenylether, etc; (3) ethyleneglycoldiethers such as ethyleneglycoldimethylether, ethyleneglycoldiethylether, ethyleneglycoldibutylether, etc; (4) ethyleneglycolmonoethers such as ethyleneglycolmonobutylether, ethyleneglycolmonoethylether, ethyleneglycolmonohexylether, ethyleneglycolmonoisopropylether, ethyleneglycolmonomethylether, ethyleneglycolmonopropylether, etc.; (5) cyclo-organic compounds containing one or more oxygen atoms such as tetrahydrofuran, γ-butyrolactone, glucono-δ-lactone, propylene oxide, etc.; and the like.

As for an oxygen-containing organic compound employed as the treating solvent, it is usually more advantageous to dilute it, before use, with a solvent of aliphatic hydrocarbon such as n-hexane, n-heptane or octane, cyclic hydrocarbon such as cyclohexane or aromatic hydrocarbon such as benzene or toluene.

The quantity of the oxygen-containing organic compound employed for the treatment may be set within the range from 0.1 to 10 moles, desirably from 0.3 to 2 moles of the oxygencontaining, organic compound to 1 mole of $TiCl_3$ in the copulverized mixture of the titanium trichloride and the organoaluminum compound. The quantity of the solvent employed as diluent of the oxygen-containing organic compound may be set within the range from 1 to 100 parts by volume, desirably from 0.2 to 20 parts of the solvent employed as diluent to 1 part of the co-pulverized mixture. The temperature range for treating the co-pulverized mixture with the oxygen-containing organic compound is generally from 0° C to the boiling point of the oxygen-containing organic compound or that of the hydrocarbon employed as diluent whichever is lower. The range of the time for treating with it is generally from 0.1 to 50 hours, desirably from 0.5 to 10 hours.

In this invention, the treated titanium trichloride prepared by the above mentioned treating conditions can bring about increase of an effect on treatment by sufficient washing with the above stated solvent as diluent. This washing with the diluent can be carried out with various methods such as the treated titanium trichloride is separated from the diluent by filtration or decantation after suspending the treated titanium trichloride in the diluent.

When α-olefin such as propylene is polmerized with a catalyst system employing the treated titanium trichloride, a great improvement of polymerization activity is brought about. However, the content of the non-crystalline polymer, the so-called attactic polymer is 20-25% in the produced polymer. Consequently the treated titanium trichloride is not useful by itself as a component of a catalyst for producing a crystalline polymer of α-olefin. The mechanism as to the enhancement of the polymerization activity of the treated titanium trichloride is unknown. It, however, seems that the crystal structure of the titanium trichloride is somehow changed, because the X-ray diffraction pattern of the treated titanium trichloride shows a pead around $2\theta = 32°$, which never appears in those of the crystalline titanium trichloride compound consisting of a titanium trichloride and an aluminum trichloride. It is presumed, therefore, that such a change in the crystal structure of the titanium trichloride is causing the increased polymerization activity.

A catalyst component obtained by treating the treated titanium trichloride with a halide of a metal selected from the groups IV and V of the periodic table is useful for polymerization of α-olefin and provides a great improvement in yield of stereospecific or crystalline polymer. In this invention it is indispensable to treat the titanium trichloride with a halide of a metal selected from the groups IV and V of the periodic table.

The treatment with a halide of a metal selected from the groups IV and V of the periodic table in this invention is carried out as follows: the treated titanium trichloride is suspended in a halide of a metal or a dilute solution of it and mixed; then a solid fraction (hereinafter called "a reformed titanium trichloride") is separated from a liquid fraction by filtration or decantation and finally washed with an inert hydrocarbon several times to wash off a metal halide.

The halides of metals selected from the groups IV and V of the periodic table available for this inventive treatment include: titanium tetrafluoride, titanium tetrachloride, titanium tetrabromide, titanium tetraiodide, silicon tetrachloride, germanium tetrachloride, vanadium tetrachloride, and so on. These halides of metals are used either bythemselves or as solution of solvents belonging to aliphatic hydrocarbon such as n-heptane or n-hexane or cyclid hydrocarbon such as cyclohexane.

The quantity of the halide of metal employed for the treatment may be within the range from 0.1 to 100 parts, by weight desirably from 1 to 20 parts to 1 part of the treated titanium trichloride. The quantity of the solvent employed for dilution of the halide of metal may be within the range from 0.1 to 100 parts by volume, desirably from 10 to 50 parts to 1 part of the halide of metal. The range of the temperatures for treating with the halide of metal is generally from 0° to 150° C, desirably from 10° to 80° C. The range of the time for treating with it is from 0.1 to 50 hours, desirably from 0.5 to 20 hours in general.

Moreover the reformed titanium trichloride can be improved by sufficient washing with the above stated solvent. This washing with the solvent can be carried out with various methods such as the reformed titanium trichloride is separated from the solvent by filtration or decantation after suspending the reformed titanium trichloride in the solvent.

Thus obtained reformed titanium trichloride includes the solvent, so various kinds of dryer such as vacuum dryer, flash dryer, etc. are employed to separate the reformed titanium trichloride from the solvent. The temperature of the reformed titanium trichloride during drying is to be held below 80° C, desirably below 60° C. The time for drying is generally from 0.1 to 50 hours, desirably from 1 to 10 hours.

The reformed titanium trichloride in present invention is employed for polymerization or co-polymerization of α-olefin in combination with an organoaluminum compound which is expressed by the general formula AlRnX$_3$-n ($0 < n \leq 3$, R and X indicate a hydrocarbon radical having 1–16 of carbon atoms and a halogen atom or a hydrogen atom, respectively.)

The organoaluminum compounds as mentioned above include triethyl aluminum, diethyl aluminum chloride, ethyl aluminum sesquichloride, ethyl aluminum dichloride, triisobutyl aluminum, diisobutyl aluminum chloride and others.

When the polymerization or the co-polymerization of α-olefin is carried out with the reformed titanium trichloride obtained by the method of the present invention, there is no particular limitations to the polymerization conditions and the polymerization or the co-polymerization is carried out with various kinds of methods such as suspension polymerization, bulk polymerization, gaseous phase polymerization.

For example, in suspension polymerization using the reformed titanium trichloride, the polymerization solvent is selected from aliphatic hydrocarbon such as n-heptane or n-hexane, cyclic hydrocarbon such as cyclohexane or aromatic hydrocarbon such as benzene or tolune; the polymerization temperature is set between 20° and 200° C, desirably 50° and 90° C; and the polymerization pressure is set between 1 and 100 atm., desirably 5 and 25 atm.

In the bulk polymerization that is carried out by using liquid α-olefin as liquid phase and the gaseous phase polymerization that is carried out by using gaseous α-olefin in gaseous phase the said reformed titanium trichloride can also bring about good results.

In addition, a molecular weight adjusting agent such as hydrogen may be also employed.

To furter illustrate this invention, but not by way of limitation, the following examples are given.

EXAMPLE 1

180 grams f crystalline titanium trichloride compound, which has been prepared by reducing titanium terachloride with metal aluminum in the presence of aluminum trichloride and by removing an excess of titanium tetrachloride by distillation, and which crystalline titanium trichloride is approximately expressed by formula 3TiCl$_3$.AlCl$_3$, is put in a ball mill with 2.5 liter inner volume containing 4.5 kilograms of steel ball of 1 inch diameter in nitrogen atmospheric current for pulverization, whichis carried out for 20 hours at room temperature at the rotating speed of 100 r.p.m. Then 14.4 grams of diethyl aluminum chloride is added for co-pulverization, which is carried out for 20 hours to obtain a co-pulverized mixture comprising the crystalline titanium trichloride compound and the diethyl alumimum chloride.

A 300 ml glass flask equipped with stirring blades is filled with 50 grams of the co-pulverized mixture and a solution comprising 20 ml of n-butylether and 180 ml of n-hexane in nitrogen atmospheric current. After stirring for 2 hours at room temperature at 250–300 r.p.m., vacuum filtration is carried out in nitrogen atmospheric current to obtain a treated titanium trichloride immediately. The treated titanium trichloride is washed with 100 ml of dehydrated n-hexane on a filter five times and then the whole of the treated titanium trichloride thus obtained and a solution comprising 30 ml of titanium tetrachloride and 170 ml of n-hexane are put in a 300 ml glass flask equipped with stirring blades in nitrogen atmospheric current. After stirring for 2 hours at 60° C, vacuum filtration is carried out in nitrogen atmospheric current to obtain a reformed titanium trichloride. The reformed titanium trichloride is washed with 100 ml of dehydrated n-hexane on a filter seven times. Finally the reformed titanium trichloride is obtained by means of flash drying with nitrogen gas on the filter for 2 hours at room temperature.

0.1 gram of the reformed titanium trichloride and 0.6 gram of diethyl aluminum chloride are charged in a 2 liter stainless steel autoclave equipped with an agitator containing 1000 ml of dehydrated n-heptane as polymerization solvent. After adjusting the inside temperature of the autoclave to 70° C, 400 ml of hydrogen gas and propylene gas are introduced therein and adjusted to 10 kg/cm$^2$G of the inside pressure of it. The polymerization is considered to have begun when the propylene gas has been introduced. During the polymerization the inside temperature of the autoclave is controlled at 70° C and the inside pressure at 10 kg/cm$^2$G. After 4 hours from the beginning of the polymerization, the supply of the propylene gas is stopped and the residual propylene gas inside the autoclave is exhausted from the system gradually. The wet polymer product is separated by filtration after the residual catalyst was decomposed by means of a methyl alcohol-isopropyl alcohol mixed solution. The wet polymer product is subjected to vacuum drying to obtain 325 grams of the solid polymer. On the other hand, the filtrate is subjected to an evaporation drying process to recover 4.4 grams of n-heptane-soluble polymer.

A fraction of the solid polymer is extracted for 20 hours with n-heptane in Soxhlet Extractor and the n-heptane-insoluble polymer is separated from the n-heptane-soluble polymer. The weight percent of the n-heptane-insoluble polymer in the solid polymer is 97.6%.

As a result of the above process, polymerization activity 3250, I.Y. 96.3 and bulk density of n-heptane insoluble polymer (hereinafter called "bulk density") 0.400 are obtained, the polymerization activity and the I.Y. being defined as follows:

Polymerization activity: The weight of the solid polymer per g. of the titanium trichloride catalyst (g/g)

$$I.Y.: \frac{\text{Weight of n-heptane-insoluble polymer}}{\text{Weight of total polymer product}} \times 100 \, (\%)$$

The above definition is applied also to the following examples and comparative examples.

EXAMPLE 2

180 grams of the crystalline titanium trichloride compound which is prepared by reducing titanium tetrachloride in the same method as in Example 1 is put in a ball mill in nitrogen atmospheric current, 14.4 grams of diethyl aluminum chloride is added therein and then co-pulverization is carried out for 40 hours to obtain a co-pulverized mixture comprising the crystalline titanium trichloride compound and diethyl aluminum chloride. The co-pulverized mixture is treated with n-butyl ether and titanium tetrachloride respectively in the same procedure and under the same treatment conditions as in Example 1 to obtain a reformed titanium trichloride. Then using thus obtained reformed titanium trichloride and diethyl aluminum chloride, the polymerization of the propylene is carried out under the same polymerization conditions as in Example 1. Polymerization activity 3170, I.Y. 96.4 and bulk density 0.401 were obtained.

EXAMPLE 3

The reformed titanium trichloride is prepared under the same manufacturing conditions as in Example 1 except that 180 grams of titanium trichloride catalyst (TiCl$_3$AA manufactured by Stauffer Chemical Co. in U.S.A.) and 14.4 grams of diethyl aluminum chloride are put in the same ball mill as in Example 1 in nitrogen atmospheric current for pulverization, which is carried out for 20 hours.

Using the reformed titanium trichloride thus prepared and diethyl aluminum chloride, the polymerization of propylene is carried out under the same polymerization conditions as in Example 1. Polymerization activity 3280, I.Y. 97.1 and bulk density 0.405 are obtained.

EXAMPLE 4

140 grams of a commercially available, hydrogen reduced titanium trichloride (TiCl$_3$H manufactured by Stauffer Chemical Co., in U.S.A.) and 40 grams of aluminum trichloride are put in the same ball mill as in Example 1 in nitrogen atmospheric current and pulverized for 40 hours at room temperature to obtain a pulverized titanium trichloride containing aluminum trichloride in the form of solid solution. Then the reformed titanium trichloride is prepared under the same manufacturing conditions as in Example 1 using the above stated titanium trichloride instead of the pulverized crystalline titanium trichloride compound used in Example 1. Following this, the polymerization of propylene is carried out under the same polymerization conditions as in Example 1 to obtain polymerization activity 3025, I.Y. 97.4 and bulk density 0.404.

COMPARATIVE EXAMPLE

The co-pulverized mixture comprising the crystalline titanium trichloride and the diethyl aluminum chloride prepared under the same manufacturing conditions as in Example 1 is treated with n-butyl ether under the same treatment conditions as in Example 1 to obtain a treated titanium trichloride. And then a titanium trichloride catalyst is obtained by means of flash drying of the treated titanium trichloride with nitrogen gas on a filter. Using the titanium trichloride catalyst thus prepared and diethyl aluminum chloride, the polymerization of propylene is carried out under the same polymerization conditions as in Example 1 to obtain polymerization activity 1960, I.Y. 89.4 and bulk density 0.315.

COMPARATIVE EXAMPLE 2

The co-polymerized mixture comprising the crystalline titanium trichloride and the diethyl aluminum chloride prepared under the same manufacturing conditions as in Example 1 is not treated with n-butyl ether but a titanium trichloride catalyst is obtained by means of treatment with titanium tetrachloride under the same treatment conditions as in Example 1. Using the titanium trichloride catalyst thus prepared, and diethyl aluminum chloride, the polymerization of propylene is carried out under the same polymerization conditions as in Example 1 to obtain polymerization activity 1130, I.Y. 89.7 and bulk density 0.352.

COMPARATIVE EXAMPLE 3

Using the co-pulverized mixture comprising the crystalline titanium trichloride and the diethyl aluminum chloride prepared under the same manufacturing conditions as in Example 1, and diethyl aluminum chloride, the polymerization of propylene is carried out under the same polymerization conditions as in Example 1 to obtain polymerization activity 1440, I.Y. 89.9 and bulk density 0.355.

COMPARATIVE EXAMPLE 4

Only 180 grams of the crystalline titanium trichloride compound which is prepared by reducing titanium tetrachloride in the same method as in Example 1 is pulverized for 40 hours under the same pulverization conditions as in Example 1.

Using the pulverized crystalline titanium trichloride compound thus prepared and diethyl aluminum chloride, the polymerization of propylene is carried out under the same polymerization conditions as in Example 1 to obtain polymerization activity 1215, I.Y. 89.7 and bulk density 0.361.

COMPARATIVE EXAMPLE 5

180 grams of the crystalline titanium trichloride compound which is prepared by reducing titanium tetrachloride in the same method as in Example 1 is merely pulverized for 40 hours under the same pulverization conditions as in Example 1. This pulverized crystalline titanium trichloride compound is treated with n-butyl ether and titanium tetrachloride respectively in the same procedure and under the same treatment conditions as in Example 1. Using the titanium trichloride catalyst thus prepared and diethyl aluminum chloride, the polymerization of propylene is carried out under the same polymerization conditions as in Example 1 to obtain polymerization activity 1535, I.Y. 95.1 and bulk density 0.406.

COMPARATIVE EXAMPLE 6

180 grams of titanium trichloride which is obtained by means of flash drying with nitrogen gas after the treatment of the crystalline titanium trichloride compound with n-butyl ether under the same treatment conditions as in Example 1 and 14.4 grams of diethyl aluminum chloride are co-pulverized under the same copulverization conditions as in Example 1 to obtain a co-pulverized mixture. The co-pulverized mixture is treated with titanium tetrachloride under the same treatment conditions as in Example 1 to obtain a titanium trichloride catalyst. Using the titanium trichloride catalyst and diethyl aluminum chloride, the polymerization of propylene is carried out under the same polymerization conditions as in Example 1 to obtain polymerization activity 982, I.Y. 85.3 and bulk density 0.336.

COMPARATIVE EXAMPLE 7

The co-pulverized mixture comprising the crystalline titanium trichloride and the diethyl aluminum chloride prepared under the same manufacturing conditions as in Example 1 is treated with titanium tetrachloride under the same treatment conditions as in Example 1 and then treated with n-butyl ether under the same conditions as in Example 1 to obtain a titanium trichloride catalyst. Using the titanium trichloride catalyst thus prepared and diethyl aluminum chloride, the polymerization of propylene is carried out under the same polymerization conditions as in Example 1 to obtain polymerization activity 1517, I.Y. 89.2 and bulk density 0.347.

EXAMPLES 5–10

The reformed titanium trichloride is prepared under the same manufacturing conditions as in Example 1 except that different organoaluminum compounds are employed for the co-pulverization with the crystalline titanium trichloride compound. Using the reformed titanium trichloride thus prepared and diethyl aluminum chloride, the polymerization of propylene is carried out under the same polymerization conditions as in Example 1.

The organoaluminum compounds employed in the co-pulverization and the results of the polymerization are as shown in Table 1.

Table 1

| Example No. | Organoaluminum compounds | Polymerization activity | I.Y. | Bulk density |
|---|---|---|---|---|
| 5 | Methyl aluminum sesquichloride | 2910 | 95.5 | 0.398 |
| 6 | Triethyl aluminu | 2535 | 96.6 | 0.403 |
| 7 | Ethyl aluminum sesquichloride | 3120 | 95.2 | 0.391 |
| 8 | Ethyl aluminum dichloride | 2160 | 94.3 | 0.388 |
| 9 | Triisobutyl aluminum | 2490 | 96.7 | 0.405 |
| 10 | Diisobutyl aluminum chloride | 2715 | 96.4 | 0.401 |

EXAMPLES 11–16

The reformed titanium trichloride is prepared under the same manufacturing conditions as in Example 1 except that the diethyl aluminum chloride to be co-pulverized with the crystalline titanium trichloride compound is used in different quantities. Then, using the reformed titanium trichloride thus prepared and diethyl aluminum chloride, the polymerization of propylene is carried out under the same polymerization conditions as in Example 1.

The addition quantities of the diethyl aluminum chloride which is co-pulverized with the crystalline titanium trichloride compound and the results of the polymerization are as shown in Table 2.

Table 2

| Example No. | Addition quantity of diethyl aluminum chloride*1 | Polymerization activity | I.Y. | Bulk density |
|---|---|---|---|---|
| 11 | 1 | 1925 | 93.7 | 0.379 |
| 12 | 3 | 2480 | 92.8 | 0.381 |
| 13 | 5 | 2630 | 95.1 | 0.395 |
| 1 | 8 | 3250 | 96.3 | 0.400 |
| 14 | 10 | 2710 | 95.4 | 0.393 |
| 15 | 12 | 2500 | 93.9 | 0.380 |
| 16 | 15 | 2100 | 90.5 | 0.372 |

*1: Weight ratio per 100 parts of the crystalline titanium trichloride compound.

EXAMPLES 17–41

The reformed titanium trichloride is prepared under the same manufacturing conditions as in Example 1 except that different oxygen-containing organic compounds as employed for the treatment of the co-pulverized mixture of the crystalline titanium trichloride compound and the diethyl aluminum chloride. With the reformed titanium trichloride prepared as described above and diethyl aluminum chloride, the polymerization of propylene is carried out under the same polymerization conditions as in Example 1.

The oxygen-containing organic compounds employed for the treatment and the results of the polymerization are as shown in Table 3.

Table 3

| Example No. | Oxygen-containing organic compounds | Polymerization activity | I.Y. | Bulk density |
|---|---|---|---|---|
| 17 | ethylether | 2380 | 93.1 | 0.377 |
| 18 | propylether | 2810 | 94.1 | 0.385 |
| 19 | n-amylether | 2420 | 95.5 | 0.390 |
| 20 | isoamylether | 2550 | 92.4 | 0.375 |
| 21 | n-hexylether | 2625 | 93.9 | 0.383 |
| 22 | ethylpropylether | 2880 | 96.3 | 0.387 |
| 23 | ethylisopropylether | 2775 | 94.2 | 0.391 |
| 24 | ethylbutylether | 2950 | 95.9 | 0.400 |
| 25 | ethylisobutylether | 2865 | 95.8 | 0.401 |
| 26 | ethylisoamylether | 2780 | 95.8 | 0.399 |
| 27 | propargylether | 2590 | 94.3 | 0.382 |
| 28 | ethyleneglycoldimethylether | 2475 | 94.9 | 0.395 |
| 29 | ethyleneglycoldiethylether | 2510 | 95.0 | 0.397 |
| 30 | ethyleneglycoldibutylether | 2680 | 96.1 | 0.405 |
| 31 | ethyleneglycolmonobutylether | 2460 | 95.7 | 0.403 |
| 32 | ethyleneglycolmonoethylether | 2030 | 94.9 | 0.394 |
| 33 | ethyleneglycolmonohexylether | 2365 | 95.3 | 0.399 |
| 34 | ethyleneglycolmonoisopropylether | 2520 | 94.9 | 0.390 |
| 35 | ethyleneglycolmonomethylether | 2284 | 92.5 | 0.381 |
| 36 | ethyleneglycolmonopropylether | 2100 | 94.4 | 0.387 |
| 37 | anisole | 2670 | 94.0 | 0.385 |
| 38 | phenetole | 2620 | 92.0 | 0.374 |
| 39 | diphenylether | 2745 | 94.4 | 0.390 |
| 40 | tetrahydrofuran | 2583 | 95.8 | 0.401 |
| 41 | γ-butyrolactone | 2830 | 96.9 | 0.406 |

EXAMPLES 42–47

The reformed titanium trichloride is prepared under the same manufacturing conditions as in Example 1 except that the n-butylether to treat the co-pulverized mixture comprising the crystalline titanium trichloride compound and the diethyl aluminum chloride is used in different quantities. Using the reformed titanium trichloride thus prepared and diethyl aluminum chloride, the polymerization of propylene is carried out under the same polymerization conditions as in Example 1.

The addition quantities of the n-butylether employed for the treatment and the results of the polymerization are as shown in Table 4.

Table 4

| Example No. | Addition quantity of n-butylether (ml) | Polymerization results | | |
|---|---|---|---|---|
| | | Polymerization activity | I.Y. | Bulk density |
| 42 | 2 | 1515 | 90.1 | 0.367 |
| 43 | 5 | 2370 | 92.9 | 0.385 |
| 44 | 10 | 2615 | 95.1 | 0.398 |
| 1 | 20 | 3250 | 96.3 | 0.400 |
| 45 | 30 | 2770 | 94.0 | 0.391 |
| 46 | 40 | 2825 | 95.2 | 0.397 |
| 47 | 50 | 2890 | 94.6 | 0.389 |

EXAMPLES 48–43

The reformed titanium trichloride is prepared under the same manufacturing conditions as in Example 1 except that different halides of metals are employed for the treatment of the treated titanium trichloride which is treated with n-butylether under the same treatment conditions as in Example 1 after the co-pulverization of the crystalline titanium trichloride compound and the diethyl aluminum chloride under the same co-pulverization conditions as in Example 1. Using the reformed titanium trichloride thus prepared and diethyl aluminum chloride, the polymerization of propylene is carried out under the same polymerization conditions as in Example 1.

The halides of metals employed for treatment and the results of the polymerization are as shown in Table 5.

Table 5

| Example No. | Halides of metals | Polymerization results | | |
|---|---|---|---|---|
| | | Polymerization activity | I.Y. | Bulk density |
| 48 | Titanium tetrafluoride | 2715 | 94.8 | 0.388 |
| 49 | Titanium tetrabromide | 2810 | 95.4 | 0.393 |
| 50 | Titanium tetraiodide | 3070 | 96.0 | 0.405 |
| 51 | Silicon tetrachloride | 2840 | 95.8 | 0.403 |
| 52 | Germanium tetrachloride | 2695 | 93.1 | 0.380 |
| 53 | Vanadium tetrachloride | 2420 | 95.1 | 0.395 |

EXAMPLES 54–60

The reformed titanium trichloride is prepared under the same manufacturing conditions as in Example 1 except that the titanium tetrachloride to treat the treated titanium trichloride which is treated with n-buthylether under the same treatment conditions as in Example 1 after the co-pulverization of the crystalline titanium trichloride compound and the diethyl aluminum chloride under the same manufacturing conditions as in Example 1 is used different quantities. Using the reformed titanium trichloride thus prepared and diethyl aluminum chloride, the polymerization of propylene is carried out under the same polymerization conditions as in Example 1.

The addition quantities of the titanium tetrachloride employed for the treatment and the results of the polymerization are as shown in Table 6.

Table 6

| Example No. | Addition quantity of titanium tetrachloride (ml) | Polymerization results | | |
|---|---|---|---|---|
| | | Polymerization activity | I.Y. | Bulk density |
| 54 | 2 | 2010 | 90.0 | 0.345 |
| 55 | 5 | 2220 | 90.5 | 0.349 |
| 56 | 10 | 2765 | 91.0 | 0.327 |
| 57 | 20 | 3090 | 95.5 | 0.398 |
| 58 | 40 | 2855 | 94.8 | 0.391 |
| 59 | 100 | 1710 | 90.3 | 0.320 |
| 60 | 200 | 1305 | 85.4 | 0.346 |

EXAMPLE 61

0.05 gram of the reformed titanium trichloride manufactured in Example 1 and 0.6 gram of diethyl aluminum chloride are placed in a 2 liter stainless steel autoclave equipped with an agitator and further 640 grams of liquid propylene and 400 ml of hydrogen gas are introduced therein. The inside temperature of the autoclave is raised to 70° C and then agitation begins. It is assumed that the polymerization starts at the time when agitation begins. During the polymerization reaction, the inside temperature of the autoclave is maintained at 70° C. After 4 hours from the beginning of the polymerization, the propylene which remains in the system is exhaused gradually. The wet polymer product is separated by filtration after the residual catalyst was decomposed by means of a methyl alcohol-isopropyl alcohol mixed solution. The wet polymer product is subjected to vacuum drying to obtain 293 grams of solid polymer.

As a result, polymerization activity 5860, I.Y. 94.3 and bulk density 0.415 are obtained.

COMPARATIVE EXAMPLE 8

Using the titanium trichloride catalyst manufactured in Comparative Example 4 and diethyl aluminum chloride, the bulk polymerization of propylene is carried out under the same polymerization conditions as in Example 61 to obtain polymerization activity 2840, I.Y. 89.5 and bulk density 0.384.

EXAMPLE 62

50 grams of the crystalline polypropylene which is extracted with n-heptane to remove atactic polymer and then dried, classified and deoxidized, is put in a 2 liter stainless steel autoclave equipped with an agitator in nitrogen atmospheric current. Then 0.6 gram of diethyl aluminum chloride, 100 ml of dehydrate n-heptane and 0.05 gram of the reformed titanium trichloride manufactured in Example 1 are added therein. The propylene gas is introduced therein and the inside temperature of the autoclave is raised to 70° C. After the polymerization for 4 hours at the total pressure of 25 kg/cm²G, the propylene gas which remains in the system is exhausted gradually. The wet polymer product is separated by filtration after the residual catalyst was decomposed by means of a methyl alcohol-isopropyl alcohol mixed solution. The wet polymer product is subjected to vacuum drying to obtain 275 grams of solid polymer.

As a result, polymerization activity 4500, I.Y. 95.2 and bulk density 0.400 are obtained.

COMPARATIVE EXAMPLE 9

Using the titanium trichloride catalyst manufactured in Comparative Example 4 and diethyl aluminum chloride, the gaseous phase polymerization of propylene is carried out under the same polymerization conditions as in Example 62 to obtain polymerization activity 2120, I.Y. 91.2 and bulk density 0.382.

EXAMPLE 63

The co-polymerization of propylene and ethylene is carried out using the reformed titanium trichloride manufactured in Example 1.

0.1 gram of the reformed titanium trichloride and 0.6 gram of diethyl aluminum chloride are put in a 2 liter stainless steel autoclave equipped with an agitator containing 1000 ml of n-heptane as polymerization solvent in nitrogen atmospheric current. After adjusting the inner temperature of the autoclave at 70° C, the mixed gas consisting of propylene and ethylene (the content of ethylene is 5 mole %) is introduced therein. The inside pressure of the autoclave is maintained at 10 kg/cm²G. The polymerization is considered to have begun when the mixed gas has been introduced. After 4 hours from the beginning of the polymerization, the supply of the mixed gas is stopped and the residual mixed gas inside the autoclave is exhausted from the system gradually. The wet polymer product is separated by filtration after the residual catalyst was decomposed by means of methyl alcohol-isopropyl alcohol mixed solution. The wet polymer product is subjected to vacuum drying to obtain 440 grams of solid polymer.

As a result, polymerization activity 4400 and I.Y. 87.7 are obtained.

COMPARATIVE EXAMPLE 10

Using the titanium trichloride catalyst manufactured in Comparative example 4 and diethyl aluminum chloride, the co-polymerization of propylene and ethylene is carried out under the same co-polymerization conditions as in Example 63 to obtain polymerization activity 2990 and I.Y. 85.1.

EXAMPLE 64

Using the reformed titanium trichloride prepared in Example 1, the polymerization of butene-1 is carried out.

1 gram of the reformed titanium trichloride and 1.2 grams of diethyl aluminum chloride are placed in a 2 liter stainless steel autoclave equipped with stirring blades and containing 700 ml of dehydrated n-heptane, in nitrogen atmospheric current. Subsequently, 300 grams of liquid butene-1 is added; and the inside temperature of the autoclave is raised to 70° C. The polymerization is considered to have begun when liquid butene-1 has been poured into the autoclave. The inside temperature of the autoclave is kept at 70° C during polymerization. After 4 hours from the start of the polymerization, the residual gas of butene-1 inside the autoclave is exhausted from the system. The residual catalyst is decomposed by means of a methyl alcohol-isopropyl alcohol mixture; and the wet polymer product is separated by filtration and dried by vacuum drying to obtain 206 grams of solid polymer product. On the other hand, the soluble polymer contained in the polymerization solvent is recovered by subjecting the filtrate to an evaporation drying process. A fraction of the solid polymer is extracted for 24 hours with ethylether by in Soxhlet Extractor and the ethylether-insoluble polymer is separated from the ethylether-soluble polymer. As a result of the above processes, polymerization activity 206 and I.Y. 95.1 are obtained.

While the definition of the polymerization activity given in Example 1 is still applied to this example, the I.Y. in this example is defined as shown below:

$$I.Y. = \frac{\text{Weight of ethylether-insoluble polymer}}{\text{Weight of total polymer product}} \times 100\ (\%)$$

COMPARATIVE EXAMPLE 11

Using the titanium trichloride catalyst manufactured in Comparative Example 4 and diethyl aluminum chloride, the polymerization of butene-1 is carried out under the same polymerization conditions as in Example 64 to obtain polymerization activity 112 and I.Y. 86.4.

What is claimed is:

1. A method of preparing reformed titanium trichloride catalyst for α-olefin polymerization which comprises simultaneously pulverizing
    (1) a crystalline titanium trichloride compound comprising titanium trichloride and aluminum trichloride, and
    (2) an organoaluminum compound of the formula $AlRnX_{3-n}$ wherein R represents a hydrocarbon radical of 1–16 carbon atoms, $n$ is equal to or less than three but greater than zero, and X represents halogen or hydrogen, subsequently treating the pulverized mixture with an oxygen-containing organic solvent, separating the treated titanium trichloride from the solvent, and finally treating the thus treated titanium trichloride with a halide of a metal selected from the groups IV and V of the periodic table,
    the weight ratio of said organoaluminum compound to said crystalline titanium trichloride compound being from 0.1:100 to 25:100, said oxygen-containing organic compound being at least one aliphatic ether selected from the group consisting of ethylether, propylether, n-butylether, n-amylether, iso-amylether, n-hexylether, ethylpropylether, ethylisopropylether, ethylbutylether, ethylisobutylether, ethylisoamylether and propargylether, at least one aromatic ether selected from the group consisting of anisole, phenetole and diphenylether, at least one ethyleneglycoldiether selected from the group consisting of ethyleneglycoldimethylether, ethyleneglycoldiethylether and ethyleneglycoldibutylether, at least one ethyleneglycolmonoether selected from the group consisting of ethyleneglycolmonobutylether, ethyleneglycolmonoethylether, ethyleneglycolmonohexylether, ethyleneglycolmonoisopropylether, ethyleneglycolmonomethylether and ethyleneglycolmonopropylether, or at least one cycloorganic compound selected from the group consisting of tetrahydrofuran, γ-butyrolactone, glucono-δ-lactone and propylene oxide.

2. The method as defined in claim 1, wherein said crystalline titanium trichloride compound is a crystalline compound which is obtained by reducing titanium tetrachloride with metal aluminum in the presence of aluminum trichloride.

3. The method as defined in claim 1, wherein said crystalline titanium trichloride compound is a pulverized compound which is obtained by pulverizing a crystalline compound, which is obtained by reducing titanium tetrachloride with metal aluminum in the presence of aluminum trichloride.

4. The method as defined in claim 1, wherein said crystalline titanium trichloride compound is a solid solution which is obtained by reducing titanium tetrachloride with hydrogen or metal aluminum, admixing the titanium trichloride with aluminum trichloride, and pulverizing the resultant mixture.

5. The method as defined in claim 1, wherein said organoaluminum compound is at least one selected from the group consisting of trimethyl aluminum, triethyl aluminum, tri-n-propyl aluminum, tri-n-butyl aluminum, triisobutyl aluminum, tri-n-hexyl aluminum, tri-2-pentyl aluminum, tri-n-octyl aluminum, tri-n-decyl aluminum, tri-n-dodecyl aluminum, tri-n-hexadecyl aluminum, diethyl aluminum chloride, di-n-propyl aluminum chloride, diisobutyl aluminum chloride, methyl aluminum sesquichloride, ethyl aluminum dichloride, isobutyl aluminum dichloride, diethyl aluminum iodide, diethyl aluminum hydride and diisobutyl aluminum hydride.

6. The method as defined in claim 1, wherein said oxygen-containing organic compound is at least one aliphatic ether selected from the group consisting of ethylether, propylether, n-butylether, n-amylether, iso-amylether, n-hexylether, ethylpropylether, ethylisopropylether, ethylbutylether, ethylisobutylether, ethylisoamylether and propargylether.

7. The method as defined in claim 1, wherein said oxygen-containing organic compound is at least one aromatic ether selected from the group consisting of anisole, phenetole and diphenylether.

8. The method as defined in claim 1, wherein said oxygen-containing organic compound is at least one ethyleneglycoldiether selected from the group consisting of ethyleneglycoldimethylether, ethyleneglycoldiethylether and ethyleneglycoldibutylether.

9. The method as defined in claim 1, wherein said oxygen-containing organic compound is at least one ethyleneglycolmonoether selected from the group consisting of ethyleneglycolmonobutylether, ethyleneglycolmonoethylether, ethyleneglycolmonohexylether, ethyleneglycolmonoisopropylether, ethyleneglycolmonomethylether and ethyleneglycolmonopropylether.

10. The method as defined in claim 1, wherein said oxygen-containing organic compound is at least one cycloorganic compound selected from the group consisting of tetrahydrofuran, γ-butyrolactone, glucono-δ-lactone and propylene oxide.

11. The method as defined in claim 1, wherein the molar ratio of said oxygen-containing organic compound to the pulverized mixture of the crystalline titanium trichloride and the organoaluminum compound is from 0.1 : 1 to 10 : 1.

12. The method as defined in claim 1, wherein said oxygen containing organic compound is used in the form of diluted solution with a diluent selected from the group consisting of an aliphatic hydrocarbon, a cyclic hydrocarbon and an aromatic hydrocarbon.

13. The method as defined in claim 12, wherein the volume ratio of said diluent to said pulverized mixture is from 1 : 1 to 100 : 1.

14. The method as defined in claim 1, wherein said treated titanium trichloride is washed with a diluent selected from the group consisting of an aliphatic hydrocarbon, cyclic hydrocarbon and an aromatic hydrocarbon.

15. The method as defined in claim 1, wherein said halide of a metal is selected from the group consisting of titanium tetrafluoride, titanium tetrachloride, titanium tetrabromide, titanium tetraiodide, silicon tetrachloride, germanium tetrachloride and vanadium tetrachloride.

16. The method as defined in claim 1, wherein the weight ratio of said halide of a metal to the treated titanium trichloride, is from 0.1 : 1 to 100 : 1.

17. The method as defined in claim 1, wherein said halide of a metal is used in the form of diluted solution with a diluent selected from the group consisting of an aliphatic hydrocarbon and a cyclic hydrocarbon.

18. The method as defined in claim 17, wherein the volume ratio of said diluent to said halide of a metal is from 0.1 : 1 to 100 : 1.

19. The method as defined in claim 1, wherein said reformed titanium trichloride catalyst is washed with a diluent selected from the group consisting of an aliphatic hydrocarbon and a cyclic hydrocarbon.

20. A method of polymerizing or co-polymerizing α-olefin in the presence of a catalyst system consisting of:

(A) a reformed titanium trichloride catalyst which is prepared by simultaneously pulverizing
 (1) a crystalline titanium trichloride compound comprising titanium trichloride and aluminum trichloride, and
 (2) an organoaluminum compound of the formula $AlR_nX_{3-n}$, wherein R represents a hydrocarbon radical of 1–16 carbon atoms, $n$ is equal to or less than three but greater than zero, and X represents halogen or hydrogen, subsequently treating the pulverized mixture with an oxygen-containing organic solvent, separating the treated titanium trichloride from the solvent, and finally treating the thus treated titanium trichloride with a halide of a metal selected from the groups IV and V of the periodic table; and (B) an organoaluminum compound, the weight ratio of said organoaluminum compound (A) (2) to said crystalline titanium trichloride compound being from 0.1:100 to 25:100, said oxygen-containing organic compound being at least one aliphatic ether selected from the group consisting of ethylether, propylether, n-butylether, n-amylether, iso-amylether, n-hexylether, ethylpropylether, ethylisopropylether, ethylbutylether, ethylisobutylether, ethylisoamylether and propargylether, at least one aromatic ether selected from the group consisting of anisole, phenetole and diphenylether, at least one ethyleneglycoldiether selected from the group consisting of ethyleneglycoldimethylether, ethyleneglycoldiethylether and ethyleneglycoldibutylether, at least one ethyleneglycolmonoether selected from the group consisting of ethyleneglycolmonobutylether, ethyleneglycolmonoethylether, ethyleneglycolmonohexylether, ethyleneglycolmonoisopropylether, ethyleneglycolmonomethylether and ethyleneglycolmonopropylether, or at least one cycloorganic compound selected from the group consisting of tetrahydrofuran, γ-butyrolactone, glycono-δ-lactone and propylene oxide.

21. The method as defined in claim 20, wherein said α-olefin is selected from the group consisting of ethylene, propylene and butene-1.

22. The method as defined in claim 20, wherein said organoaluminum compound (B) is selected from the group consisting of triethyl aluminum, diethyl aluminum chloride, ethyl aluminum sesquichloride, ethyl aluminum dichloride, triisobutyl aluminum and diisobutyl aluminum chloride.

23. The method as defined in claim 20, wherein said polymerization or co-polymerization is carried out by suspension polymerization, bulk polymerization or gaseous phase polymerization.

24. The method as defined in claim 23, wherein said suspension polymerization is carried out with a solvent selected from the group consisting of aliphatic hydrocarbon, cyclic hydrocarbon and aromatic hydrocarbon.

25. The method as defined in claim 24, wherein the polymerization temperature ranges from 20 to 200° C.

26. The method as defined in claim 24, wherein the polymerization pressure ranges from 1 to 100 atm.

* * * * *